United States Patent [19]

Larson et al.

[11] 4,352,416
[45] Oct. 5, 1982

[54] CAST IRON RAILROAD BRAKE SHOES

[75] Inventors: Hugo R. Larson, Ridgewood; Chandi P. Biswas, Ramsey, both of N.J.

[73] Assignee: Abex Corp., Columbus, Ohio

[21] Appl. No.: 859,259

[22] Filed: Dec. 12, 1977

Related U.S. Application Data

[63] Continuation-in-part of Ser. No. 759,231, Jan. 18, 1977, abandoned.

[51] Int. Cl.³ .............................................. F16D 69/02
[52] U.S. Cl. .......................... 188/251 M; 75/123 CB; 192/107 M
[58] Field of Search ........................... 188/251 M, 255; 192/107 M; 75/123 CB, 123 D, 123 G

[56] References Cited

U.S. PATENT DOCUMENTS

| 1,527,165 | 2/1925 | Bennett | 75/123 CB |
| 1,690,352 | 11/1928 | Williams | 75/123 CB |
| 1,941,672 | 1/1934 | Fahrenwald | 188/251 M |
| 2,887,421 | 5/1959 | Peras | 75/123 CB |
| 3,533,758 | 10/1970 | Lowe et al. | 75/123 CB |
| 3,620,334 | 11/1971 | Henley et al. | 188/251 M |
| 3,767,386 | 10/1973 | Veda et al. | 188/251 M |

*Primary Examiner*—Edward R. Kazenske
*Attorney, Agent, or Firm*—Kinzer, Plyer, Dorn & McEachran

[57] ABSTRACT

A cast iron railroad brake shoe containing more than 2% phosphorus with sulfur and manganese present in the ratio of weight % sulfur > weight % manganese/1.8; the amount of sulfur in excess of weight % Mn/1.8 accounts for increased wear resistance in proportion to said excess.

2 Claims, 2 Drawing Figures

CAST IRON RAILROAD BRAKE SHOES

RELATED APPLICATION

This application is a continuation-in-part of application Ser. No. 759,231, filed Jan. 18, 1977 now abandoned.

This invention relates to the metallurgy of cast iron railroad brake shoes.

From the standpoint of predictable performance and reliability, the superior friction material applied to a railroad car wheel is cast iron, particularly where the service requirements are severe as in the instance of applying the brakes for a long time during a steep descent with a heavy load.

For many years the standard metallurgy of the cast iron railroad brake shoe was deemed to be approximately 3% carbon, 1.5% silicon, no more than about 0.15% sulfur, and no more than about 1.5% phosphorus, balance iron except for impurities; manganese would be present if scrap iron or steel featured in the source of iron, which was invariably the case. Indeed, sulfur and phosphorus were classified as undesired residuals contained in the coke or metal charge employed in making the iron.

An improvement in the metallurgy of cast iron railroad brake shoes is disclosed in U.S. Pat. No. 3,620,334 (also see British Pat. No. 1,238,646). There is a drastic increase in the amount of phosphorus, unexpectedly accounting for reduced sparking and flaming which is of considerable merit from the standpoint of reducing the chances for an accidental fire which can and does happen as a result of sparks generated at the interface between the shoe and the wheel. Of equal importance is the fact that the higher phosphorus level is responsible for a decrease in wear rate, meaning longer service life.

The threshhold of improved performance appears to be 2% (by weight) phosphorus with no greater advantages beyond an upper limit of about 6%. Carbon and silicon may be virtually unchanged compared to the earlier metallurgy: carbon and silicon may be present in a total percentage of 6% or less, with a preference for carbon of about 2.5/3.5% and silicon of 1.6/2.2%.

The grey cast iron shoe with more than 2% phosphorus consists predominately of grains of pearlite and/or ferrite (and graphite) in a continuous network of a ternary eutectic (steadite); that is the steadite surrounds the pearlitic and/or ferritic grains as shown by the photomicrograph. The steadite in the typical casting (say 2.8% carbon, 3.0% phosphorus) solidifies at about 1750° F. compared to the material outside the network which solidifies at about 2100° F. The steadite consists of $Fe_3C$, $Fe_3P$ and Fe. It is believed the steadite network, a continuous one induced by the large amount of phosphorus, is responsible for the unexpected advantages of the high phosphorus shoe. The iron in the eutectic may take different forms, depending on the casting technique, which is not important to either an understanding of the present invention or its practice. For example, the brittleness of the iron may be varied by heat treatment without altering its continuity within the purview of the present invention.

It has now been found in accordance with the present invention that a railroad brake shoe containing 2/5% (that is, 2 to 5%) phosphorus may be further improved by employing sulfur in amounts which further reduces the wear rate, that is, the life of the shoe is further improved whilst the spark or flame suppressing role of phosphorus is affected only to a minor extent.

It is believed that the improved wear resistance in accordance with the present invention is due to the eutectic being reinforced by FeS (iron sulfide). Whatever the theory, the plain fact is the wear resistance is improved by employing sulfur in excess of that required to form MnS (manganese sulfide). The reason for equating the amount of sulfur to MnS is the iron employed is bound to contain some manganese which preferentially combines with sulfur. This MnS is doubtless associated in the pearlite and/or ferrite grains which lie outside the network of eutectic material.

The atomic weight of manganese is fifty-five; that of sulfur is thirty-two so for each weight percent of sulfur present, manganese is consumed in the proportion of 55/32, equal to about 1.72. Allowing for a small amount of uncombined sulfur in solid solution and similar minor effects, the amount (weight %) of sulfur not consumed and therefore available for the eutectic may be written as S-(Mn/1.8), that is, the weight percent of sulfur present minus the weight percent of manganese present (each by analysis) divided by 1.8.

IN THE DRAWING

Figure 1:
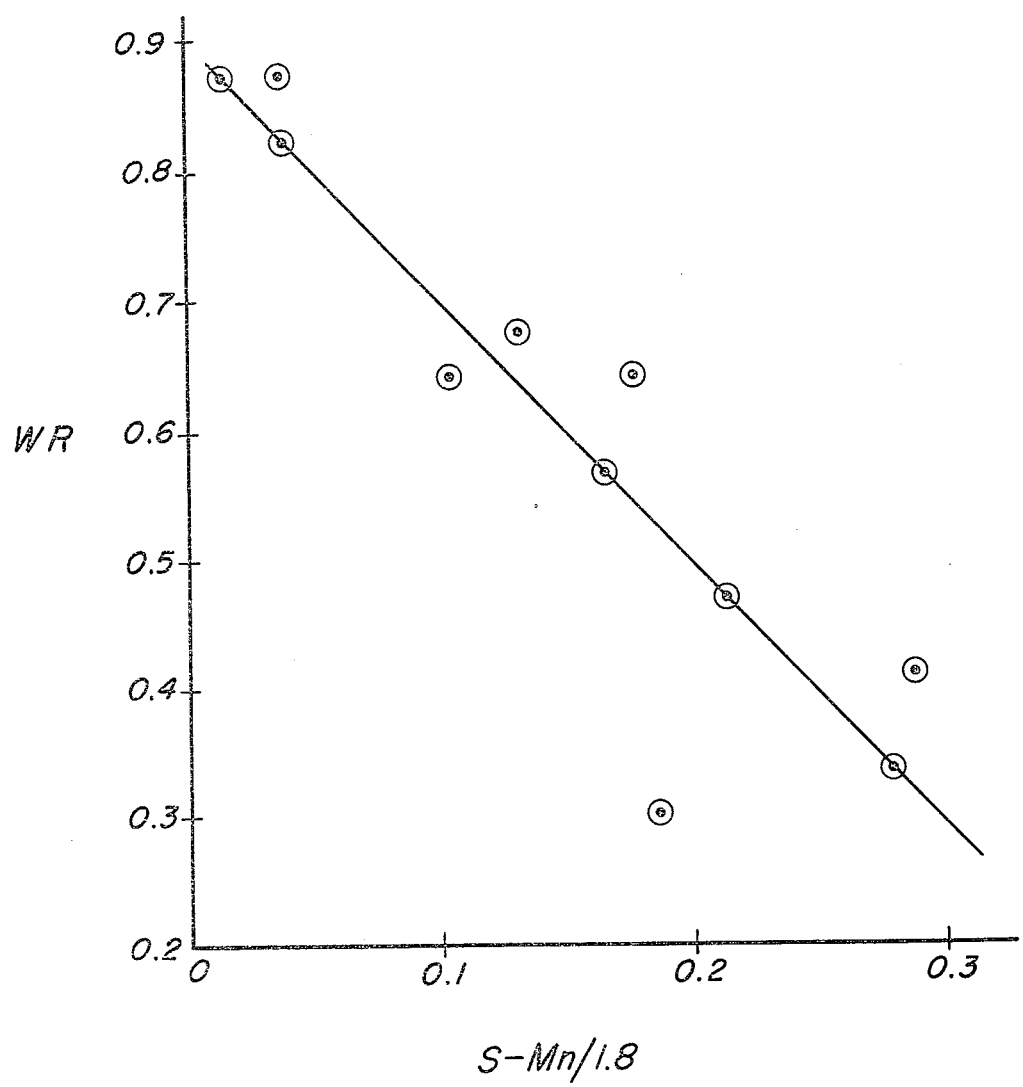
FIG. 1 is a curve (straight line plot) showing the wear ratio of a railroad brake shoe as affected by the amount of sulfur present.
Figure 2:
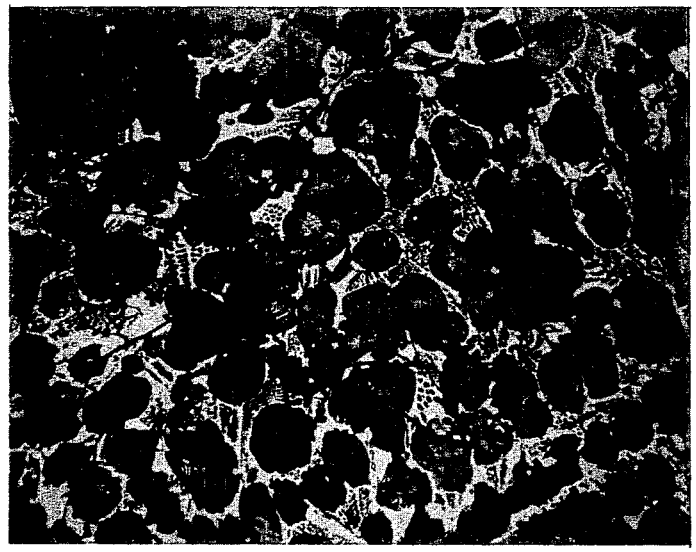
FIG. 2 is a photomicrograph (200×).

The curve shown in the drawing was plotted on the basis of data in Table I and those data were obtained from a dynamometer, comparing the test shoes to a standard shoe for the wear ratio. The standard shoe had the following (nominal) analysis: carbon 2.8%, silicon 2.1% and phosphorus 3%. By first measuring the wear of the standard shoe and then measuring the wear of each successive test shoe, all under the same dynamometer conditions, it is possible to calculate the relative wear rates, that is, Test Shoe/Standard Shoe.

TABLE 1

| | (Weight %; nominal 3% P) | | | |
|---|---|---|---|---|
| Test Shoe | % S | % Mn | S-(Mn/1.8) | Wear Ratio |
| 1 | 0.45 | 0.30 | 0.283 | 0.41 |
| 2 | 0.33 | 0.36 | 0.13 | 0.67 |
| 3 | 0.43 | 0.27 | 0.28 | 0.34 |
| 4 | 0.41 | 0.40 | 0.188 | 0.30 |
| 5 | 0.41 | 0.42 | 0.177 | 0.64 |
| 6 | 0.38 | 0.30 | 0.213 | 0.47 |
| 7 | 0.33 | 0.30 | 0.163 | 0.57 |
| 8 | 0.215 | 0.36 | 0.015 | 0.87 |
| 9 | 0.335 | 0.53 | 0.041 | 0.82 |
| 10 | 0.27 | 0.42 | 0.037 | 0.87 |
| 11 | 0.375 | 0.49 | 0.103 | 0.64 |

The curve establishes that as the excess sulfur increases the wear ratio (WR) declines, that is, as the sulfur content increases in excess of that which can combine with manganese, the wear rate decreases. In a practical sense this means that railroad brake shoes can be expected to sustain more emergency stops, or more severe ones, accordingly as the excess sulfur content is increased, which can also be of considerable importance where the brakes of the train are applied for a long time during descent in mountainous regions of the world.

The range of carbon and silicon has already been given; phosphorus is in the range of more than 2 to up to 10% by weight but 2.4 to less than 5% is preferred.

It will be seen from the foregoing that if the shoe contains at least 2% phosphorus, principally to reduce the tendency to flame, it is possible to tolerate at least, and considerably more than, 0.15% sulfur in the shoe without adverse effect; indeed the shoe is further improved as evidenced by the curve, which at the very least permits the use of an iron with more sulfur than previously suspected. Such an iron is usually less expensive.

The photomicrograph (200×) is typical of the standard shoe, as well as the test shoes, employed in the dynamometer testing and shows the steadite as a continuous network (white) surrounding the (dark) grains of pearlite.

The railroad brake shoe of the present invention, then, consists essentially of (weight %):

Carbon—2.5 to 3.5
Silicon—1.6 to 2.2
Phosphorus—more than 2 and up to 10
Sulfur and Manganese both present in the ratio of weight % S > weight % Mn/1.8 balance iron except for impurities and tramp elements. The steadite forms as a natural result of the thermodynamics of cooling the casting and requires, for formation, no special treatment of any kind.

We claim:

1. A cast iron railroad brake shoe consisting essentially of about (weight %):

Carbon—2.5 to 3.5;
Silicon—1.6 to 2.2;
Phosphorus—more than 2 and up to 10;
Sulfur and Manganese both present in the ratio of weight % S > weight % Mn/1.8;
balance essentially iron except for impurities and tramp elements;
the amount of sulfur in excess of weight % Mn/1.8 accounting for increased wear resistance in proportion to said excess.

2. A cast iron railroad brake shoe according to claim 1 in which the amount of sulfur present exceeds 0.15% weight of the shoe.

* * * * *